(12) United States Patent
Huynh (10) Patent No.: US 10,108,900 B2
(45) Date of Patent: Oct. 23, 2018

(54) JEWELRY WITH SECURITY BEZEL FOR REGULATING NEAR FIELD COMMUNICATION WITH AN EMBEDDED NEAR FIELD COMMUNICATION CHIP

(71) Applicant: Chi Huynh, San Dimas, CA (US)

(72) Inventor: Chi Huynh, San Dimas, CA (US)

( * ) Notice: Subject to any disclaimer, the term of this patent is extended or adjusted under 35 U.S.C. 154(b) by 332 days.

(21) Appl. No.: 15/097,635

(22) Filed: Apr. 13, 2016

(65) Prior Publication Data

US 2016/0232439 A1 Aug. 11, 2016

Related U.S. Application Data

(63) Continuation-in-part of application No. 14/589,961, filed on Jan. 5, 2015, now Pat. No. 9,824,310, which is a continuation-in-part of application No. 14/517,827, filed on Oct. 18, 2014, now Pat. No. 9,444,524.

(51) Int. Cl.
| | |
|---|---|
| *A44C 17/02* | (2006.01) |
| *A44C 15/00* | (2006.01) |
| *A44C 25/00* | (2006.01) |
| *G06K 19/077* | (2006.01) |
| *H04W 4/80* | (2018.01) |
| *H04B 5/00* | (2006.01) |
| *H04W 4/00* | (2018.01) |
| *H04M 1/725* | (2006.01) |

(52) U.S. Cl.
CPC ........ *G06K 19/07762* (2013.01); *A44C 17/02* (2013.01); *H04B 5/0031* (2013.01); *H04W 4/008* (2013.01); *H04W 4/80* (2018.02); *H04B 5/0062* (2013.01); *H04M 1/7253* (2013.01); *H04M 2250/04* (2013.01)

(58) Field of Classification Search
CPC ... A44C 9/0053; A44C 17/005; A44C 17/006; A44C 17/007; A44C 17/008; A44C 17/02; A44C 17/0208; A44C 17/0216; A44C 25/001; A44C 25/007
USPC .......................................................... 63/26
See application file for complete search history.

(56) References Cited

U.S. PATENT DOCUMENTS

| | | |
|---|---|---|
| D182,205 S | 2/1958 | Schreiber |
| 4,080,803 A | 3/1978 | Suzuki |
| | (Continued) | |

FOREIGN PATENT DOCUMENTS

| | | |
|---|---|---|
| CN | 102204516 B | 12/2012 |
| CN | 102332106 B | 1/2014 |
| | (Continued) | |

OTHER PUBLICATIONS

JP2014-230581 Office Action dated Jan. 7, 2016.
(Continued)

*Primary Examiner* — Jack W Lavinder
(74) *Attorney, Agent, or Firm* — Wagenknecht IP Law Group PC (57) ABSTRACT

An article of jewelry comprising a precious or semi-precious gem; a near field communication (NFC) chip; and a bezel, wherein the bezel comprises an electrically conductive material switchable between a closed configuration defined by a continuous electrically conductive loop encircling the NFC chip and an open configuration defined by a gap preventing formation of an electrically conductive loop continuously encircling the NFC chip. Methods of protecting data using the article of jewelry.

15 Claims, 9 Drawing Sheets

(56) References Cited

U.S. PATENT DOCUMENTS

| | | |
|---|---|---|
| 4,608,838 A | 9/1986 | Gardner |
| 6,868,804 B1 | 3/2005 | Huisma et al. |
| 7,596,967 B2 | 10/2009 | Ostfeld |
| 7,962,369 B2 | 6/2011 | Rosenberg |
| 7,980,469 B2 | 7/2011 | Matsuo |
| D647,419 S | 10/2011 | Wong |
| 8,131,645 B2 | 3/2012 | Lin |
| D662,437 S | 6/2012 | Verdeille |
| 8,240,568 B2 | 8/2012 | Matsuo |
| 8,280,305 B2 | 10/2012 | Tamura |
| D675,952 S | 2/2013 | Dholakiya |
| D680,023 S | 4/2013 | Ho |
| 8,768,250 B2 | 7/2014 | Ma |
| 8,942,672 B2 | 1/2015 | Renard |
| D727,200 S | 4/2015 | Kwon |
| 9,042,817 B2 | 5/2015 | Tse |
| 9,082,267 B2 | 7/2015 | Rosenberg |
| 9,092,813 B2 | 7/2015 | Pappas |
| D754,025 S | 4/2016 | Baid |
| 9,489,612 B2 | 11/2016 | Boulby |
| D786,119 S | 5/2017 | Huynh |
| 2004/0112087 A1 | 6/2004 | Bishop |
| 2004/0250570 A1 | 12/2004 | Huynh |
| 2007/0288249 A1 | 12/2007 | Rowe et al. |
| 2008/0015013 A1 | 1/2008 | Gelman et al. |
| 2008/0016913 A1 | 1/2008 | Ray et al. |
| 2010/0147226 A1 | 6/2010 | Tsengas |
| 2011/0248088 A1 | 10/2011 | Edouard et al. |
| 2012/0215935 A1 | 8/2012 | Woods |
| 2013/0234899 A1 | 9/2013 | Pope et al. |
| 2013/0254159 A1 | 9/2013 | Thramann et al. |
| 2014/0116085 A1 | 5/2014 | Lam |
| 2014/0195675 A1 | 7/2014 | Silver |
| 2014/0198037 A1 | 7/2014 | Leica et al. |
| 2014/0298434 A1 | 10/2014 | Prchal |
| 2015/0042450 A1 | 2/2015 | McLear |
| 2015/0134552 A1 | 5/2015 | Engels |
| 2015/0140927 A1 | 5/2015 | Chen |
| 2015/0206046 A1 | 7/2015 | Aibazov |
| 2015/0213734 A1 | 7/2015 | Glickman |
| 2015/0249485 A1 | 9/2015 | Ouyang et al. |
| 2015/0256386 A1 | 9/2015 | Palmer |
| 2015/0263791 A1 | 9/2015 | Chein |
| 2015/0294214 A1 | 10/2015 | Boulby |
| 2015/0349556 A1 | 12/2015 | Mercando et al. |
| 2016/0064804 A1 | 3/2016 | Kim et al. |
| 2016/0066812 A1 | 3/2016 | Cheng et al. |
| 2016/0112097 A1 | 4/2016 | Huynh |
| 2016/0196487 A1 | 7/2016 | Huynh |

FOREIGN PATENT DOCUMENTS

| | | |
|---|---|---|
| JP | 2007091453 A | 12/2007 |
| JP | 3176725 U | 7/2012 |
| KR | 20030039941 | 5/2003 |
| WO | 2005015986 A2 | 2/2005 |
| WO | 2014016609 A1 | 1/2014 |
| WO | 2016/089965 A1 | 6/2016 |
| WO | 2017180099 | 10/2017 |

OTHER PUBLICATIONS http://mdcdiamonds.com/images/ProductImages/ES838wg-1.jpg. Retrieved Jun. 8, 2016.

PCT/US2016/027055 International Search Report and Written Opinion dated Jun. 30, 2016.

JEWELRY WITH SECURITY BEZEL FOR REGULATING NEAR FIELD COMMUNICATION WITH AN EMBEDDED NEAR FIELD COMMUNICATION CHIP

CROSS REFERENCE TO RELATED APPLICATIONS

This is a continuation in part of U.S. patent application Ser. No. 14/589,961 filed Jan. 5, 2015 and a continuation in part of U.S. patent application Ser. No. 14/517,827 filed Oct. 18, 2014; the entire content of each is herein incorporated by reference in its entirety.

TECHNICAL FIELD

The invention relates to jewelry and more specifically to an article of jewelry that selectively permits and denies near field communication with an embedded near field communication (NFC) chip by way of a reversibly closable bezel which closes to form a continuous electrically conductive loop around the NFC chip and opens to break the continuous loop.

BACKGROUND OF THE INVENTION

Jewelry is often given at special occasions, such as birthdays, anniversaries, vacations, and other memorable life events. Those that receive such gifts often wish to preserve and relive these memories; however, the moment itself is often not recorded or the recording is lost among numerous other recordings thereby losing its intended close association with the jewelry. Thus, it would be beneficial to develop articles of jewelry that are able store memories themselves as retrievable digital files.

Radio frequency identification (RFID) is a technology commonly used for tracking purposes, often to replace bar codes. RFID tags contain an antenna and memory that stores data. Identifying or reading the data is accomplished using an RFID reader. RFID tags are widespread in the retail industry by helping stores keep track of inventory. RFID tags have also been incorporated into pearls. In WO2005/015986, a method of making a pearl is demonstrated where an RFID chip is fixed to the surface of the nucleus before the nucleus is inserted into the pearl oyster. This prevents identifying information specific to each pearl from being erased for tracking or classification purposes. Similarly, CN102332106B provides an approach to identify and manage pearls by embedding an RFID chip in a pearl for identification purposes. The RFID chip is added after boring into the pearl because the chip could be easily damaged if provided as part of a nucleus.

Near field communication (NFC) is a more finely honed version of RFID. It operates within a maximum range of about 4-10 cm and can operate in one- or two-way communication. NFC communication involves the modulation of a magnetic field between two devices, commonly referred to as an initiator and target. The initiator generates the RF field and the target modulates the field using power from the initiator. NFC-enabled features are now commonly integrated into smart phones. This technology is also being adopted for financial transactions where touching a NFC smart phone to a NFC checkout terminal, instructs payment, thereby replacing credit cards. In addition, data can be shared directly between NFC smart phones by just tapping phones together.

A challenge with NFC antenna design is that performance of the NFC antenna is degraded when positioning the NFC chip near electrically conductive metals. While RFID tags have been used to track pearls, pearls are nonconductive. That is, the nacre coating does not conduct electricity. To this end, the mere substitution of the pearl's nacre coating with desirable previous metals that are highly electrically conductive, such as silver or gold, would not be appropriate for an NFC embedded chip since it prevents communication between an NFC chip and an NFC enabled device.

Even if challenges associated with incorporating an NFC chip into metallic jewelry so that data can be read is accomplished, a further challenge involves the protection of privacy and security of the data stored on the NFC chip. That is, data stored on an NFC chip is inherently at risk of theft by unauthorized reading by others. This can be especially challenging because jewelry is typically worn so that it is highly visible to others. Thus, outward display of jewelry that incorporates an NFC chip could direct a thief precisely to the location of the NFC chip for data theft. Similarly, NFC chips are also at risk of malicious writing, where programming is unknowingly transferred to the NFC chip by another, which could lead to cyber attack on a later communicating NCF enabled device.

Accordingly, there remains a need to develop a new article of jewelry that is able to combine precious metals, which are highly conductive, into NFC enabled jewelry. There also remains a need to provide security features for NFC chips embedded within jewelry.

SUMMARY OF THE INVENTION

The invention addresses the need to provide an article of jewelry which includes precious metals, is able to store and transmit data through near field communication, and provides a security feature to selectively authorize and deny the transfer of data over near field communication with embedded near field communication chips.

The above is accomplished in one aspect of the invention, by the development of an article of jewelry, which includes a precious or semi-precious gem; a near field communication (NFC) chip; and a bezel, wherein the bezel is formed at least in part from an electrically conductive material and is positioned along a same plane as the NFC chip, further wherein the bezel is switchable between a closed configuration defined by a continuous electrically conductive loop encircling the NFC chip, and an open configuration defined by a gap preventing formation of an electrically conductive loop continuously encircling the NFC chip.

In a related aspect of the invention, an article of jewelry is provided, which includes a precious or semi-precious gem; a near field communication (NFC) chip; and a bezel, wherein the bezel is formed at least in part from an electrically conductive material, further wherein the bezel is switchable between an open configuration that permits near field communication with the NFC chip and a closed configuration that prevents near field communication with the NFC chip.

In another related aspect of the invention an article of jewelry is provided, which includes a precious or semi-precious gem; a near field communication (NFC) chip; and a bezel substantially but not entirely surrounding the NFC chip, wherein the bezel is formed from an electrically conductive material, further wherein the article of jewelry is switchable between a closed configuration defined by a continuous electrically conductive loop encircling the NFC chip and an open configuration defined by a break that prevents a continuous electrically conductive loop. In some embodiments, the bezel is a noncontinuous ring having opposing ends separated by a gap, which can be flanged outward. In some embodiments one or more opposing end has a throughbore and a collar, where the collar is nonconductive and configured to fit in the throughbore. In some embodiments the article of jewelry also includes an electrically conductive connector or substrate, such as a loop or clasp, threaded through the one or more collars, where the one or more collars interfere with or prevent electrical connection between the bezel and the substrate. In some embodiments, the collars are removable to permit electrical contact between the electrically conductive substrate and the bezel. In other embodiments, the collars are rotatable and have a slot that permits electrical contact between the electrically conductive substrate and bezel.

In another related aspect of the invention, a method of protecting data stored on a near field communication (NFC) chip within an article of jewelry is provided, the method including providing an article of jewelry in a closed configuration, wherein the article of jewelry includes a precious or semi-precious gem; a near field communication (NFC) chip with stored data; and a bezel; wherein the bezel is formed at least in part from an electrically conductive material, further wherein the article of jewelry, such as through the bezel, is switchable between an open configuration that permits near field communication with the NFC chip and the closed configuration that prevents near field communication with the NFC chip. In a related embodiment the invention also includes a method of protecting data, which includes: providing an article of jewelry in an open configuration, wherein the article of jewelry includes a precious or semiprecious gem, a near field communication (NFC) chip having data loaded thereon, and a bezel, wherein the bezel is formed of an electrically conductive material, further wherein the article of jewelry is switchable between the open configuration that permits near field communication with the NFC chip, and a closed configuration that prevents near field communication with the NFC chip; providing an NFC enabled device; writing data to the NFC chip with the NFC enabled device; and closing the article of jewelry to the closed configuration. In a preferred embodiment, the bezel has opposing ends separated by a gap, each opposing end having a throughbore and a collar configured to fit in the throughbore, wherein the collars are formed from a nonconductive material, further wherein in one variation the open configuration is defined by the collars fitted within the throughbores and an electrically conductive substrate prevented from electrically connecting the opposing ends of the bezel and the closed configuration defined by the collars removed from the throughbores and permitting electrical connection between the electrically conductive substrate and the bezel. In another variation, the open configuration is defined by the collars fitted within the throughbores and an electrically conductive substrate prevented from electrically connecting the opposing ends of the bezel and the closed configuration is defined by the electrically conductive substrate fitted into slots of the collars to electrically connect with opposing ends of the bezel.

In yet another related aspect of the invention, a method of protecting personal data is provided, which includes providing an article of jewelry in an open configuration, wherein the article of jewelry includes a precious or semi-precious gem, a near field communication (NFC) chip stored with data, and a bezel, wherein the bezel is formed at least in part from an electrically conductive material, further wherein the bezel is switchable between the open configuration that permits near field communication with the NFC chip, and a closed configuration that prevents near field communication with the NFC chip; providing an NFC enabled device; writing data, such as a text file, an image file or an audio file, to the NFC chip with the NFC enabled device; and closing the bezel to the closed configuration.

Each of the above aspects can be provided in various embodiments. For example, in some embodiments the precious or semi-precious gem is a gemstone selected from the group consisting of an agate, an alexandrite, an amber, an ametrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, an iolite, a jadcite, a kupzite, a lapis lazuli, a moonstone, a malachite, a moamite, an onyx, an opal, a pearl, a peridot, a red corundum, a ruby, a sardonyx, a sapphire, a spessartine, a sphene, a spinel, a star ruby, a sapphire, a sunstone, a tanzanite, a tiger eye, a tourmaline, a topaz, a turquoise, a tsavorite, a moissanite, and a zircon. In other embodiments the semi-precious gem is an artificial gem or a replica of a gem, where the artificial gem or replica is not electrically nonconductive.

In a preferred embodiment of the above aspects, the bezel is opened and closed by displacement of an electrically conductive connector or substrate across a gap that separates opposing ends of the bezel. This can be accomplished by providing the connector with two ends, wherein a first end is fixedly connected to a first end of the bezel and a second end is reversibly connectable to an opposing end of the bezel. In such an embodiment, removing connection opens the bezel to permit near field communication with the NFC chip and closing the connection bridges the gap to permit a continuous electrically conductive loop to prevent near field communication with the NFC chip. This can be further embodied by providing the first end of the connector hinged to the bezel.

In another embodiment, the entire connector is displaced from the bezel. In some embodiments, the connector is a metallic ring that removably rests along an upper perimeter of the bezel to reversibly bridge the gap to reversibly electrically join opposing ends of the bezel. In further embodiments, the article of jewelry is a ring and the connector is also a ring of a same ring size, which provides a jewelry set. In still another embodiment, the connector is a dial, which can be turned to electrically connect and electrically disconnect opposing ends of the bezel. In a still another embodiment, the connector is an electrically conductive substrate such as a metal chain that forms a necklace, a metal loop, a metal clasp, or a metal pin, where a nonconductive substrate or collar reversibly blocks electrical contact between the bezel and the substrate. In such configurations, the nonconductive substrate can reversibly fit in throughbores positioned through opposing ends of the bezel.

Permitting and preventing communication with the NFC chip is regulated by opening and closing the bezel or reversibly joining ends of the bezel with a conductive material. Closing the bezel forms a continuous loop of electrically conductive material around the perimeter of the NFC chip to interfere with near field communication. In some embodiments the bezel is formed from a metal. In some embodiments the bezel is sliver. In other embodiments the bezel is gold.

In the open configuration there is a break in conductivity such that the bezel lacks a continuous electrically conductive loop around the NFC chip. The electrically conductive continuous loop as provided in the closed configuration is absent in the open configuration. In some embodiments the bezel surrounds at least 85% but less than 100% of the outer perimeter of the NFC chip along the same plane when in the open configuration.

The gem and NFC chip can be embedded within the article of jewelry by gluing the gem or NFC chip to one or more suitable substrate mounts and attaching the substrate mount(s) to the bezel. To this end, the article of jewelry can include a nonconducting substrate, wherein the gem and the NFC chip are mounted to the substrate. In further embodiments, the substrate can include a lower layer and an upper layer separating the gem from the NFC chip. In still further embodiments, the upper layer comprises mother of pearl.

BRIEF DESCRIPTION OF THE DRAWINGS

Embodiments of the invention can be better understood with reference to the following drawings, which form part of the specification and represent preferred embodiments. The components in the drawings are not necessarily to scale, emphasis instead being placed upon illustrating the principles of the invention. And, in the drawings, like reference numerals designate corresponding parts throughout the several views.

DETAILED DESCRIPTION OF PREFERRED EMBODIMENTS

For clarity of disclosure, and not by way of limitation, the invention is discussed according to different detailed embodiments; however, the skilled artisan will recognize through the guidance herein that features of one embodiment can be combined with other embodiments and therefore such combinations are within the intended scope of the invention.

Unless defined otherwise, all technical and scientific terms used herein have the same meaning as is commonly understood by one of ordinary skill in the art to which this invention belongs. If a definition set forth in this document is contrary to or otherwise inconsistent with a definition set forth in the art, the definition set forth in this document prevails over a contradictory definition.

The term "precious gem" as used herein refers to a precious stone for ornamentation. The term "semi-precious gem" as used herein refers to a semi-precious stone for ornamentation. A "semi-precious gem" is also intended to encompass an artificial gem or a replica of a gem. Preferably, the "precious gem" and "semi-precious gem" is cut and polished.

The term "opaque" as used herein refers to the inability to see through a material across the visible spectrum. An "opaque layer" is not transparent. An "opaque layer" may be reflective.

The term "electrically conductive material" or "conductive material" as used herein refers to a material that conducts electricity such that if completely surrounding a NFC chip at a distance of about 5 mm would prevent near field communication with the encircled NFC chip. The most electrically conductive element is silver, followed by copper and gold, each of which is highly electrically conductive. The SI unit for conductivity S/m. A "highly electrically conductive material" as used herein is 10'S/m or more and is the preferred material for the bezel. "Lesser conductive materials" as used herein refers to a material having a conductivity of about $10^6$ S/m. "Lesser conductive materials" can be suitable for connectors but do not tend to be sufficiently efficient for use as the bezel itself. "Lesser conductive materials" can include titanium or titanium alloy as used in the jewelry industry. "Nonconductive materials" are also termed "insulators." "Nonconductive materials" can include various polymers including plastics, rubbers, glass and ceramics and are not suitable for either the bezel or connector but are suited for collars.

The term "continuous loop" as used herein refers to a loop that does not end. The term "electrically conductive continuous loop" or "continuous electrically conductive loop" as used herein refers to a material that permits an electrical charge to continue around a loop many times.

The term "NFC interfering loop" as used herein refers to a loop of "conductive material" with or without and amount of "lesser conductive material" to prevent near field communication with a surrounded NFC chip.

The term "near field communication chip" or "NFC chip" as used herein refers to an unpowered chip capable of acting as a passive target under near field communication standards as known in the electronic communication arts. The "near field communication signal" typically operates within a distance of about 4-10 cm or less and at a frequency of about 13.56 MHz. Near field communication operates using electromagnetic induction between two loop antennas located within each other's near field, effectively forming an air-core transformer between an initiator and target. More specifically an initiator device provides a carrier field, and the target device answers by modulating the existing field. Thus the NFC chip draws its operating power from the initiator-provided electromagnetic field. An "NFC enabled device" as used herein refers to a device such as a smart phone or a tablet computer that acts as an initiator to power the NFC chip. NFC chips include a loop antenna and memory that currently stores between about 96 bytes and 4 MB. NFC chips can be read only but are preferably rewritable. Reading and writing to an NFC chip can be performed using an NFC enabled device loaded with NFC software. The term "NFC chip" is intended to encompass current near field communication standards as well as further improvements that can operate in connection with remaining elements that form the article of jewelry.

The term "substantially surrounding" or "substantially around the outer perimeter" as used herein refers to an extension that surrounds between 85% and less than 100%, more preferably 90%-99.9% of the outer perimeter or circumference of the NFC chip. In further embodiments, 90%-95% of the outer perimeter or circumference of the NFC chip is surrounded by the electrically conductive material of the bezel even when in the open configuration. In some embodiments, at least 95% of the outer perimeter or circumference of the NFC chip is surrounded by the electrically conductive material of the bezel. In further embodiments, at least 96% of the outer perimeter or circumference of the NFC chip is surrounded by the electrically conductive material of the bezel. In further embodiments, at least 97% of the outer perimeter or circumference of the NFC chip is surrounded by the electrically conductive material of the bezel. In further embodiments, at least 98% of the outer perimeter or circumference of the NFC chip is surrounded by the electrically conductive material of the bezel. In further embodiments, at least 99% of the outer perimeter or circumference of the NFC chip is surrounded by the electrically conductive material of the bezel. The electrically conductive material of the bezel does not surround 100% of the perimeter or circumference of the NFC chip when in the open configuration.

The term "distance of communication" as used herein refers to the maximum distance in which an NFC enabled device can receive instructions or a message from an NFC chip. The "distance of communication" is typically less than 10 cm and preferably 4 cm or less.

Referring collectively to FIGS. 1-4, article of jewelry 10 is provided, which includes a precious or semi-precious gem 12; a near field communication (NFC) chip 14; and a bezel 16. The bezel 16, which includes an electrically conductive material, is positioned along a same plane as the NFC chip 14. The bezel 14 is switchable between a closed configuration defined by a continuous electrically conductive loop (shown in FIGS. 3 and 5) around the NFC chip and an open configuration defined by a gap 20 preventing formation of a continuous electrically conductive loop (shown in FIGS. 4 and 6) around the NFC chip.

Relatedly, an article of jewelry 10 has been developed, which includes a gem 12; a near field communication (NFC) chip 14; and a bezel 16, wherein the bezel 16 is formed at least in part from an electrically conductive material, further wherein the bezel 16 is switchable between an open configuration, where opposing ends 16A, 16B of the bezel are not joined, that permits near field communication with the NFC chip 14 and a closed configuration 14, where opposing ends 16A, 16B of the bezel 16 are electrically joined, that prevents near field communication with the NFC chip.

An implication of the above is that a method of protecting data stored on a near field communication (NFC) chip 14 within article of jewelry 10 has also been developed. In an exemplary method, an article of jewelry 10 is provided in a closed configuration, wherein the article of jewelry 10 includes a precious or semi-precious gem 12; a near field communication (NFC) chip 14 with stored data, such as a text, image, video or audio file; and a bezel 16; wherein the bezel 16 is formed at least in part from an electrically conductive material, further wherein the bezel 16 is switchable between an open configuration that permits near field communication with the NFC chip 14 and the closed configuration that prevents near field communication with the NFC chip 14.

Relatedly, a method of protecting data has also been developed, which includes providing an article of jewelry 10 in an open configuration, wherein the article of jewelry 10 includes a precious or semiprecious gem 12, a near field communication (NFC) chip 14 stored with data, and a bezel 16, wherein the bezel 16 is formed at least in part from an electrically conductive material, further wherein the bezel 16 is switchable between the open configuration that permits near field communication with the NFC chip 14, and a closed configuration that prevents near field communication with the NFC chip 14; providing an NFC enabled device 300; writing data to the NFC chip 14 with the NFC enabled device 300; and closing the bezel 14 to the closed configuration thereby protecting the data stored on the NFC chip 14. The method can further include opening the connector 18 to again permit near field communication with the NFC chip 14 and accessing the data through near field communication with an NFC enabled device 300.

The semiprecious or precious gems 12 can be selected from a variety of available gemstones or replica gemstones having a conductivity less than $10^3$ S/m. For example, suitable precious gems are gemstones selected from the group consisting of an agate, an alexandrite, an amber, an ametrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, an iolite, a jadeite, a kupzite, a lapis lazuli, a moonstone, a malachite, a moamite, an onyx, an opal, a pearl, a peridot, a red corundum, a ruby, a sardonyx, a sapphire, a spessartine, a sphene, a spinel, a star ruby, a sapphire, a sunstone, a tanzanite, a tiger eye, a tourmaline, a topaz, a turquoise, a tsavorite, a moissanite, and a zircon. In other embodiments the gem is an artificial gem or a replica of a gem, where the artificial gem or replica is not electrically nonconductive.

The article of jewelry 10 can be embodied in various forms such as a ring, an earring, a pendant, among other articles of jewelry 10. In some instances, two or more jewelry articles 10, each embedded with a NFC chip 14 are arranged along a strand to form a necklace or bracelet. By providing an NFC locking mechanism each article of jewelry 10 can be accessed individually by selectively connecting or disconnecting the connector 18 across the gap 20 of each bezel 16.

While it is envisioned that a variety of mechanisms can be used, in each of the embodiments the bezel 14 is opened and closed by displacement of an electrically conductive connector 18 across the gap 20. In some embodiments, this can be accomplished by providing the connector 18 with two ends, wherein a first end is fixedly connected to a first end 16A of the bezel 16 and a second end of the connector 18 is reversibly connectable to a second end 16B of the bezel 16. In such an embodiment, removing connection opens the bezel 16 to permit near field communication with the NFC chip 14 and closing the connection bridges opposing ends 16A, 16B across the gap 20 to form a continuous electrically conductive loop to prevent near field communication with the NFC chip 14. This can be further embodied by providing the first end of the connector hinged 22 to the bezel 16.

In another embodiment, the entire connector 18 is displaced from the bezel 16. In some embodiments, the connector 18 is a metallic ring that removably rests along the upper perimeter of the bezel 16 to reversibly bridge the gap 20 to join opposing ends 16A, 16B. In further embodiments, the article of jewelry 10 is a ring and the connector 18 is also a ring of a same ring size, which provides a jewelry set. In still another embodiment, the connector 18 is a dial, which can be turned to electrically connect and electrically disconnect opposing ends 16A, 16B of the bezel 16 to form or break an electrically conductive continuous loop around the NFC chip 14.

Thus, permitting and preventing communication with the NFC chip 14 is regulated by opening and closing a continuous electrical circuit around the bezel 16, preferably by use of the connector 18. Closing the bezel 18 forms a continuous loop of the electrically conductive material around the perimeter of the NFC chip 14 to interfere with near field communication with the NFC chip 14. In some embodiments the bezel 16 formed from a metal. In some embodiments the bezel 16 is sliver. In other embodiments the bezel 16 is gold.

Figure 5:
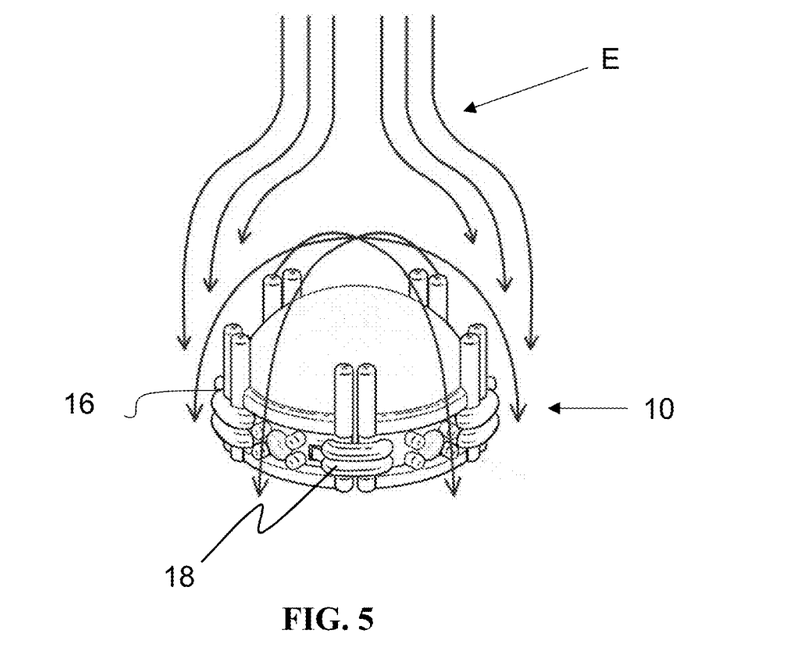
FIG. 5 depicts diversion of an electric field E from an NFC enabled device (not shown) around the article of jewelry 10 when the connector 18 and bezel 16 are in the closed configuration.
Figure 6:
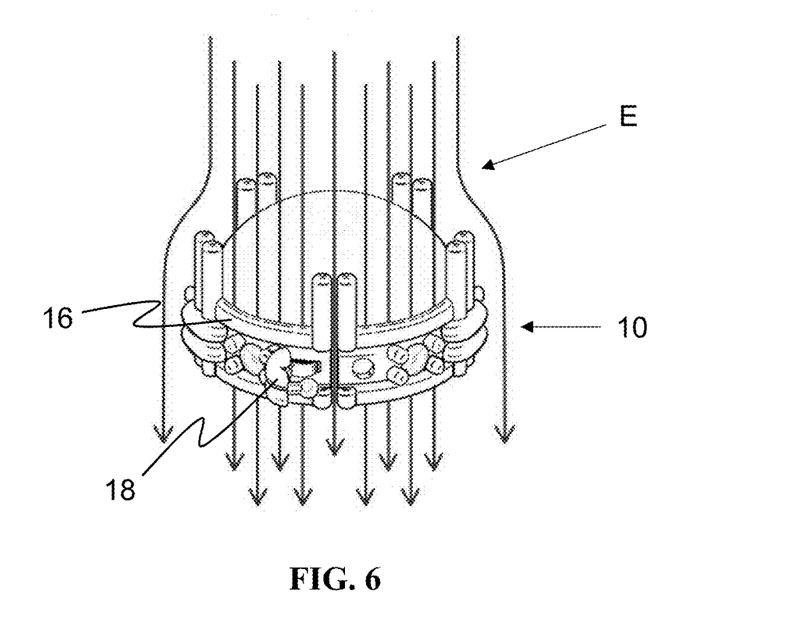
FIG. 6 depicts permitting near field communication by permitting the electric field E to access inside the article of jewelry 10 by opening the connector 18, which forms a break in the continuous electrically conductive loop of FIG. 5.

Turning again back to the embodiment depicted in FIGS. 3-6, the connector 18 is able to reversibly bridge the gap 20 to connect opposing ends 16A, 16B of the bezel 16, thereby reinstating a continuous electrical loop around the NFC chip 14, and thus preventing near field communication with the NFC chip 14. The connecting structure 18 is itself preferably formed of a highly electrically conductive material, such as a metal having a conductivity of $10^7$ S/m or more. The connecting structure 18 acts to open or close the gap 20 in the bezel 16, thus breaking or rejoining a continuous, electrically conductive loop. As shown in FIG. 5, it is believed, though not bound by theory, that when the loop created by a connected bezel 16 is permitted to conduct electricity in a continuous loop, it disrupts the electric field E generated by an NFC enabled device 300 (not shown), which prevents communicating with the NFC chip 14 located in the article of jewelry 10. As shown collectively in FIGS. 4 and 6, when the continuous electrically conductive loop of the bezel 16 is broken by opening the connector 18 from at least one of the ends 16A, 16B of the bezel 16 to expose the gap 20, the electric field E from an NFC enabled device 300 is permitted to pass into the article of jewelry 10 to communicate with the NFC chip 14, thereby permitting the transfer of information to the NFC chip 14, or permitting retrieval of information from the NFC chip 14. In this manner, the connecting structure 18 acts as a security measure, shielding the NFC chip 14 from outside electric fields E when the gap 20 is closed, and allowing transfer of information when the gap 20 is opened.

The gap 20 can be 1 mm or larger, but gaps 20 of 0.5 mm, 0.2 mm and smaller also being envisioned. In some embodiments the gap 20 is between 1 mm and 5 mm. Gaps 20 larger than 5 mm are also encompassed by the invention. In some embodiments, the gap 20 is 1 cm. In some embodiments the gap 20 is 2.5 mm. Thus, the gap 20 is preferably defined as the absence of electrically conductive material thereby providing a gap in conductivity; however a gap 20 formed as a nonconductive material, such as plastic, could nonconductively join opposing ends 16A, 16B or end regions of the bezel.

The connecting structure 18 preferably has two ends, where the first end is permanently connected to a first end 16A of the bezel 16 and the second end being reversibly connected to the second end 16B of the bezel 16. One way to permanently connect one end of the connecting structure 18 to the bezel 16A is with a hinge 22, shown in FIG. 4.

Manufacture of the article of jewelry 10 can be accomplished by positioning the NFC chip 14 beneath, above or within a desired gem 12 and positioning an electrically conductive bezel 16 along a same plane as and substantially around the NFC chip 14, such that the bezel 16 can be reversibly closed to permit and deny near field communication between and NFC enable devices 300, such as a smart phone, and the NFC chip 14. Manufacture can also include mounting a gem 12 and NFC chip 14 by gluing the gem 12 or NFC chip 14 to one or more nonconductive substrates 24A, 24B. To this end, the article of jewelry 10 can include a substrate 24A, 24B wherein the gem 12 and the NFC chip 14 are mounted to the substrate 24A, 24B. In further embodiments, the substrate 24A, 24B can include a lower substrate layer 24B and an upper substrate layer 24A separating the gem 12 from the NFC chip 14. In still further embodiments, the upper layer 24A is formed from mother of pearl. To this end, the substrates 24A, 24B should be formed essentially of a nonconductive material.

By providing an article of jewelry 10 with a housed NFC chip 14 that is rewritable, an article of jewelry 10 has been developed having hidden memory that can be rewritten numerous times to couple memories or personal expressions that can be enjoyed while viewing the jewelry 10. The files can be audio files, image files, text files, executable instructions, video files, database files and other transferable data files. As will become evident, the jewelry 10 will be able to communicate with mobile devices, such as NFC-enabled mobile phones 300 having a suitable software application so that personal communication or expressions can be enjoyed in concert with the jewelry 10. NFC communication is accomplished by opening the connector 18 to break the continuous electrically conductive loop around the NFC chip 14, and positioning the article of jewelry 10 next to or against the NFC enabled device 300. Once positioned, the NFC enabled device 300 initiates communication with the NFC chip 14 through an electric field E. The electric field E powers the passive NFC chip 14 which permits responsive communication. The NFC chip 14 communicates a message to the NFC enabled device 300, which can launch an application opening an image, video or audio file or direct a web browser to an Internet web page.

Developing the article of jewelry 10 required overcoming technical challenges with respect to combining NFC technology, metals, and conventional jewelry design. For instance, it was found that housing an NFC chip 14 within an article of jewelry 10 completely encircled by a silver or gold bezel 16 prevented communication between the NFC chip 14 and an NFC enabled device 300. Since many articles of jewelry 10, such as pendants hanging from necklaces or bracelets, are traditionally formed with a gold or silver bezel 16 it was believed an NFC chip 14 could not be housed in such articles of jewelry 10. Therefore it was believed that the bezel 16 must be formed from an electrically nonconductive material, such as a plastic. However, surrounding a gemstone with a bezel 16 formed from a nonconductive material would be considered a cheap alternative in the jewelry field and would not be an acceptable substitution. Precious metals such as gold and silver are highly desired. It was unexpectedly found that communication between the NFC chip 14 and NFC enabled mobile device could be restored by removing the continuous nature of the silver or gold bezel 16 around the NFC chip 14. That is, by cutting the gold or silver bezel 16 to form a gap 20 and thus break the continuous nature of the NFC interfering loop, near field communication with the housed NFC chip 14 could be reestablished. Therefore it was surprisingly found that providing a small gap 20 of only about a millimeter of an open ended bezel 16A, 16B would permit NFC communication.

The article of jewelry 10 has been measured to operate using near field communication at a maximum of only a few centimeters or less, thereby permitting near field communication between the article of jewelry 10 and only a closely positioned NFC enabled device 300. Preferably, communication between the NFC chip 14 and NFC enable device 300 occurs selectively within 10 cm, more preferably within 2 cm. By limiting the distance of communication, messages or expressions can be shared privately without concern of foreign NFC enabled devices 300 outside of the communication distance. However, further improvements have been developed so that the gap 20 coupled with a displaceable connector 18 offer an additional layer of security to the NFC chip 14. These measures are particularly useful when writing or retrieving personal messages or communications in areas of high population density, such as while on a bus or shuttle service, subway, train, in a crowded restaurant or other areas where NFC enabled devices 300 can be found in high density. In addition, by providing such a short distance of communication together with a closeable gap 20, the likelihood of theft or overwriting the NFC memory by others, whether intentional or not, is significantly reduced. It also permits malicious writing of code that could infect an NFC enabled device 300.

Figure 1:
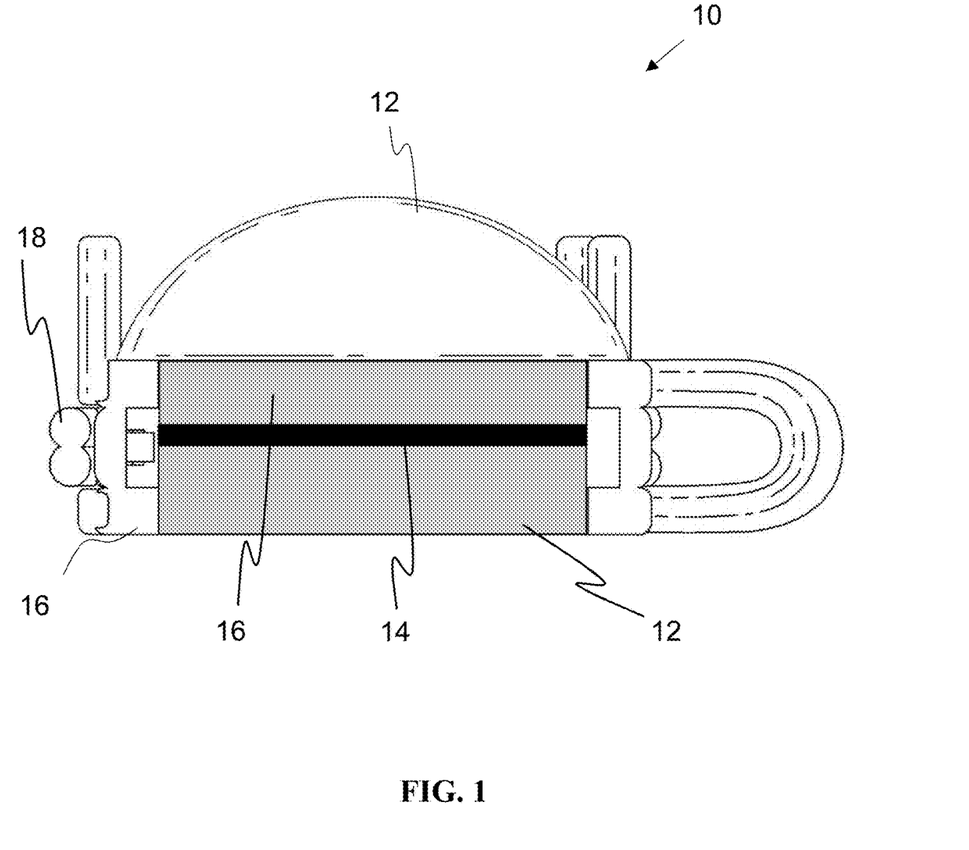
FIG. 1 is a cutaway view of an article of jewelry 10, where beneath a gemstone 12 is a hidden NFC chip 14, and around which is a bezel 16 with connector 18 in a closed configuration preventing near field communication with the NFC chip 14.
Figure 2:
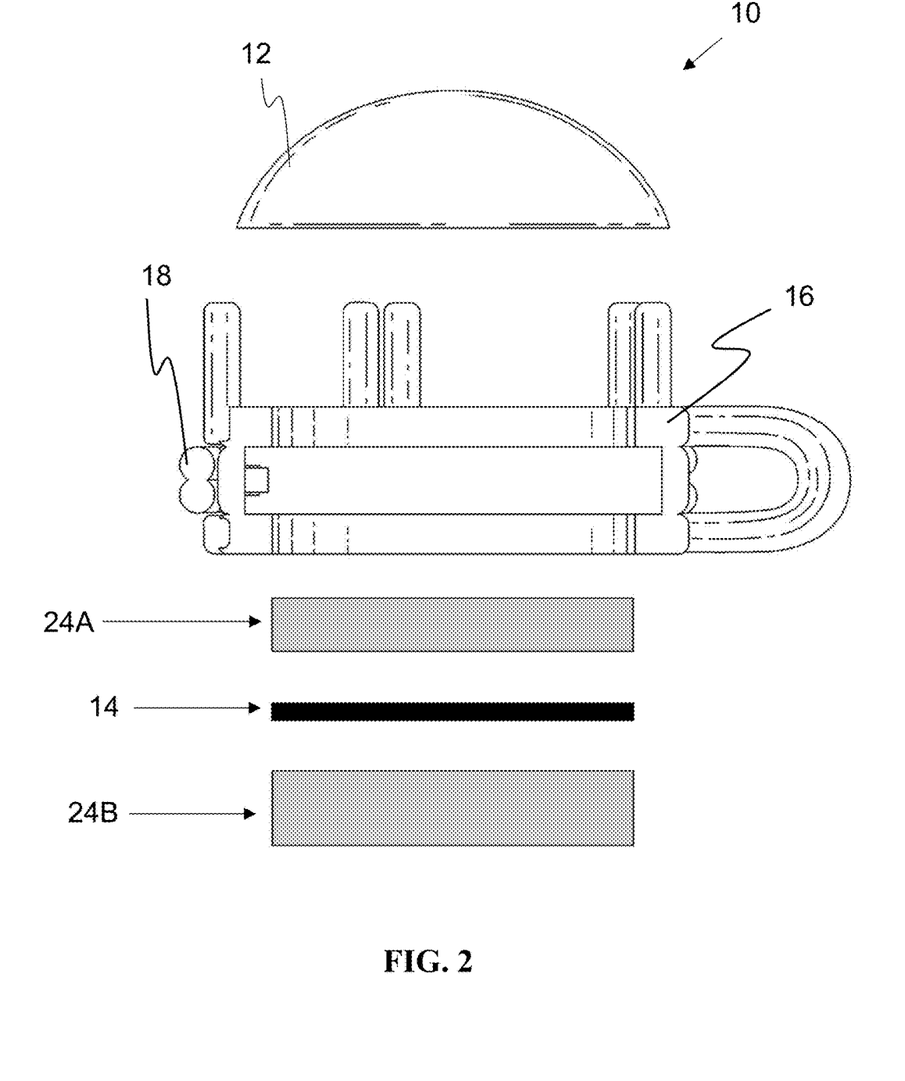
FIG. 2 is a cutaway and exploded view of the article of jewelry 10 shown in FIG. 1.
Figure 3:
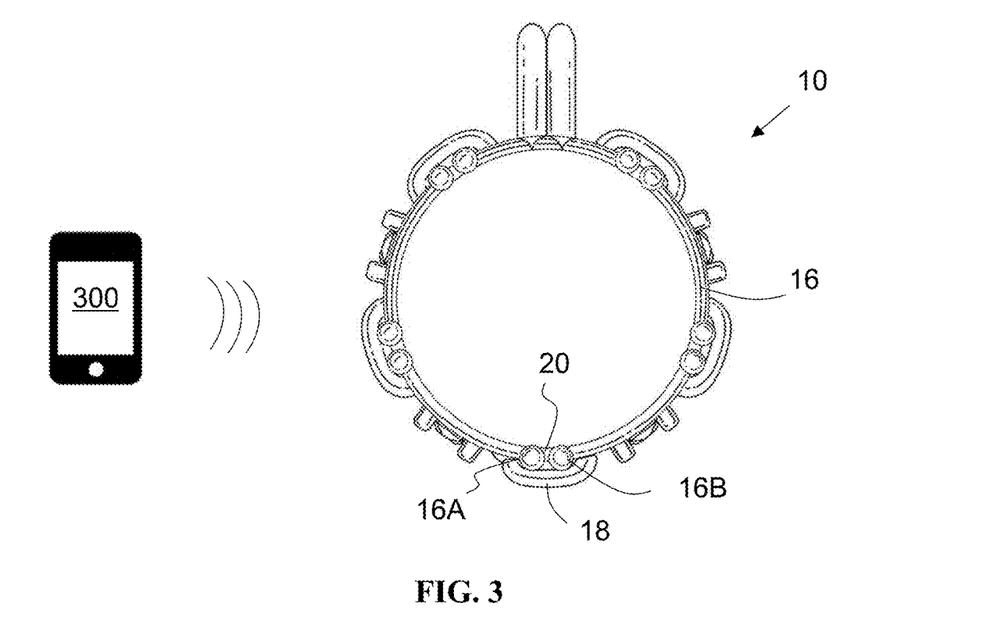
FIG. 3 is a top view of the article of jewelry 10 shown in FIG. 1, showing the connector 18 closing the gap 20 between opposing ends 16A, 16B of the bezel 16 to form a closed configuration defined by a continuous electrically conductive loop.
Figure 4:
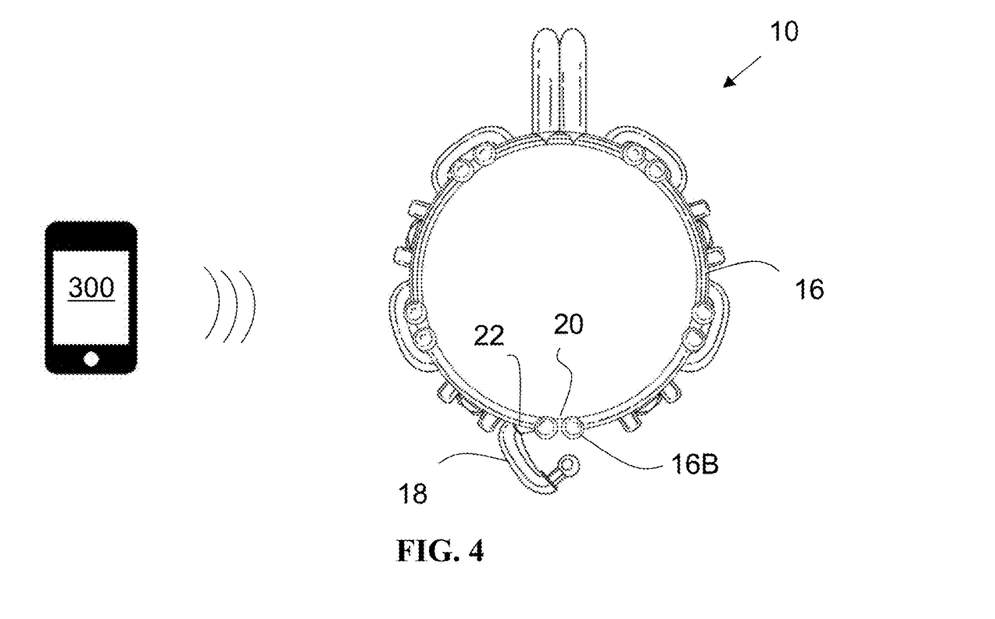
FIG. 4 is a top view of the article of jewelry 10 shown in FIG. 1, depicted in an open configuration defined by the connector 18 removed from connection from one of the ends 168 of the bezel 16 thereby permitting the gap 20 to prevent a continuous electrically conductive loop and thus prevent near field communication.

Since NFC chips 14 are quite thin and fragile, as shown in FIGS. 1 and 2, the near field communication (NFC) chip 14 can be housed or sandwiched between two nonconductive or insulated substrates 24A, 24B. The substrates 24A, 24B can be affixed to one another, thereby minimizing mechanical forces applied to the fragile NFC chip 14. The NFC chip 14 may be secured to the lower substrate 24B using an adhesive, such as double sided tape or glue. In another approach, the lower substrate 24B is formed from a polymer and prior to curing or during hardening, the NFC chip 14 is layered over the polymer such that the lower substrate 24B hardens or cures while the NFC chip 14 is present for casting integral to the lower substrate 24B. This can be accomplished by adding the NFC chip 14 to a cooling polymer melt or adding the NFC chip 14 together with or after adding a hardening catalyst as known in the polymer arts. Suitable, non-limiting examples of polymers include polyethylene terephthalate (PET) and polypropylene.

The upper substrate 24A is preferably planar, layered over the NFC chip 14 and is preferably affixed to the lower substrate 24B. The upper substrate 24B is preferably opaque and therefore prevents users from visually identifying the NFC chip 14. The circumference of the upper substrate 24A is preferably equal to or less than the circumference of the lower substrate 24B. In preferred embodiments, the upper substrate 24A also adds to the desirability of the jewelry 10 by itself being formed from a precious or semiprecious material that can be viewed at least partially through the transparent or semi-transparent outer gemstone 12 covering. In some embodiments, the upper substrate 24A is a planar slice of an opaque gemstone, such as an agate. In a preferred embodiment, the upper substrate 24A is formed from mother of pearl.

In furtherance of the above, the bezel 16 can be formed to substantially encircle the NFC chip 14 by substantially encircling the upper and lower substrates 24A, 24B. The bezel 16 extends along a same plane as the NFC chip 14 but also has a height that extends above and below the plane defined by the NFC chip 14. The bezel 16 is preferably formed from a highly conductive material, such as silver or gold, which permits the efficient flow of electrical current. As indicated above, a challenge with using a highly electrically conductive metallic bezel 14 is that when completely encircling an NFC chip 14, communication between the NFC chip 14 and NFC enable device 300 is lost. Accordingly, while the bezel 16 of the invention can be formed from metals and metal alloys, such as silver or gold, there is a technical challenge to overcome in that providing a continuous ring of such a material along the same plane and around the NFC chip 14 forms an NFC interfering loop, which prevents near field communication. However, it was surprisingly found that disrupting the continuous loop of a silver or gold bezel 16 resulted in successful communication between the NFC enabled device 300 and NFC chip 14. It was then surprisingly found by providing a reversibly connectable connector 18, data stored on the NFC chip could be selectively accessed and selectively protected from transfer.

To assist the artisan in selecting suitable materials, TABLE 1 provides a listing of materials used in the jewelry arts and provides their corresponding electrical conductivity. As general guidance gold and silver, which are highly electrically conductive, can form a bezel 16 with a highly conductive continuous loop. It was also found that opposing ends of a length of silver extending substantially but not completely around the outer perimeter of an NFC chip 14 could be joined by conventional jewelry grade titanium without loss of NFC signal. This suggests titanium could be an appropriate material for the connector 18 when using a silver bezel 16. As such, highly conductive materials of about $10^7$ Siemens per meter (S/m) tend to require a gap 20 between opposing ends 16A, 16B to retain near field communication with a housed NFC chip 14. Lesser conductive materials of about $10^6$ S/m tend to be useful as connectors 18 depending on the gap 20 width but not particularly useful as a bezel 16.

TABLE 1

| Material | Conductivity (S/m at 20° C.) |
| --- | --- |
| Silver | $6.30 \times 10^7$ |
| Copper | $5.96 \times 10^7$ |
| Gold | $4.10 \times 10^7$ |
| Aluminum | $3.50 \times 10^7$ |
| Tungsten | $1.79 \times 10^7$ |
| Zinc | $1.69 \times 10^7$ |
| Nickel | $1.43 \times 10^7$ |
| Iron | $1 \times 10^7$ |
| Platinum | $9.43 \times 10^6$ |
| Tin | $9.17 \times 10^6$ |
| Carbon steel | $6.99 \times 10^6$ |
| Titanium | $2.38 \times 10^6$ |
| Stainless steel | $1.45 \times 10^6$ |
| Glass | $1 \times 10^{-11}$ to $10^{-15}$ |
| Rubber | $1 \times 10^{-14}$ |
| Fused quartz | $1.30 \times 10^{-18}$ |

Figure 7:
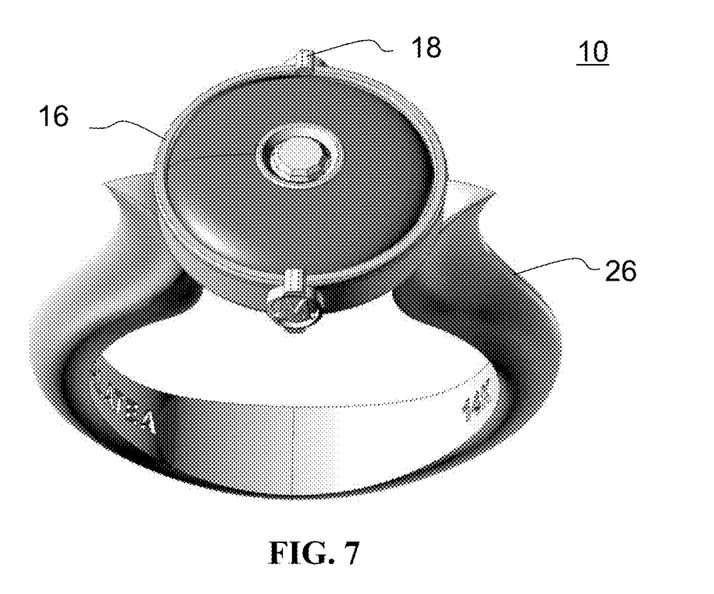
FIG. 7 is an article of jewelry 10 embodied as a ring with removable connectors 18.
Figure 8:
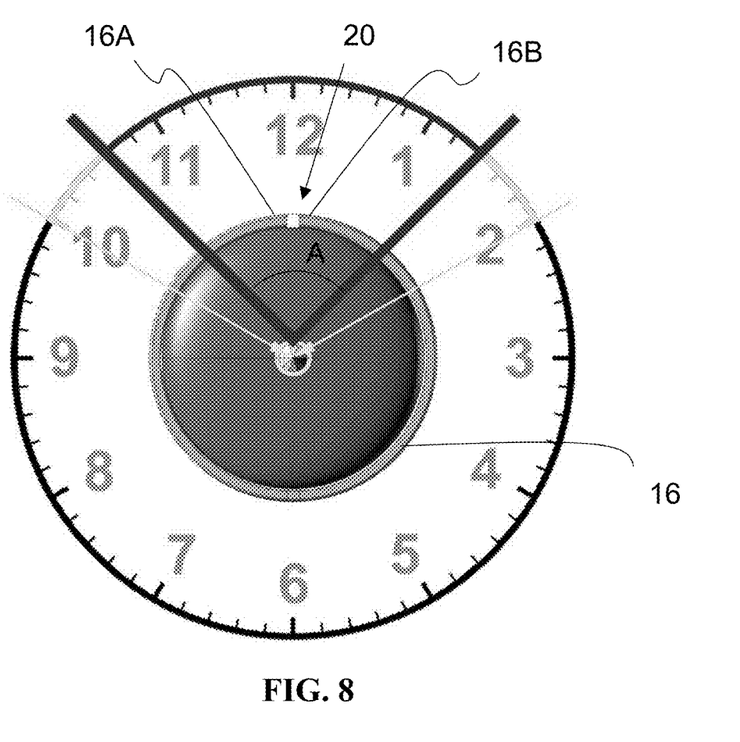
FIG. 8 shows a gap 20 separating opposing ends 16A, 16B of the bezel 16 overlaying a clock for reference for the positioning of the loop 26 of FIG. 7.

When embodying the article of jewelry 10 as a ring (shown in FIG. 7), there exists even another set of challenges. Rings are conventionally formed with hoops 26 made from highly conductive materials such as gold or silver. It was envisioned that a gold or silver hoop 26 would again establish an NFC interfering loop even when the connector 18 is in an open position; however, as show in FIG. 8, where the gap 20 is positioned relatively at 12 o'clock, as long as the pair of connections of the hoop 26 to the bezel 16 were outside of the angle A formed between about 10:30 and 1:30 (about 90 degrees apart), or more reliably between about 10 and 2 o'clock, NFC communication could be maintained. Thus, it was found that the relationship between the gap 20 and the hoop 26 of the ring, and presumably hoop of earrings and other hoops, should be about 90 degrees apart from one another to permit near field communication with the NFC chip 14.

In view of the above, the skilled artisan will appreciate that the article of jewelry 10 can be adapted for use in a variety of forms, including a pendent for a necklace or charm for a bracelet, an earring, a ring and other forms of jewelry.

Now, turning to FIGS. 9-12, the invention also provides an article of jewelry 100 having a precious or semi-precious gem 112; a near field communication (NFC) chip 114; and a bezel 116 substantially but not entirely surrounding the NFC chip 114, wherein the bezel 116 is formed of an electrically conductive material, further wherein the article of jewelry 100 is switchable between a closed configuration defined by a continuous electrically conductive loop encircling the NFC chip 114 and an open configuration defined by a break in the electrically conductive loop.

Figure 9:
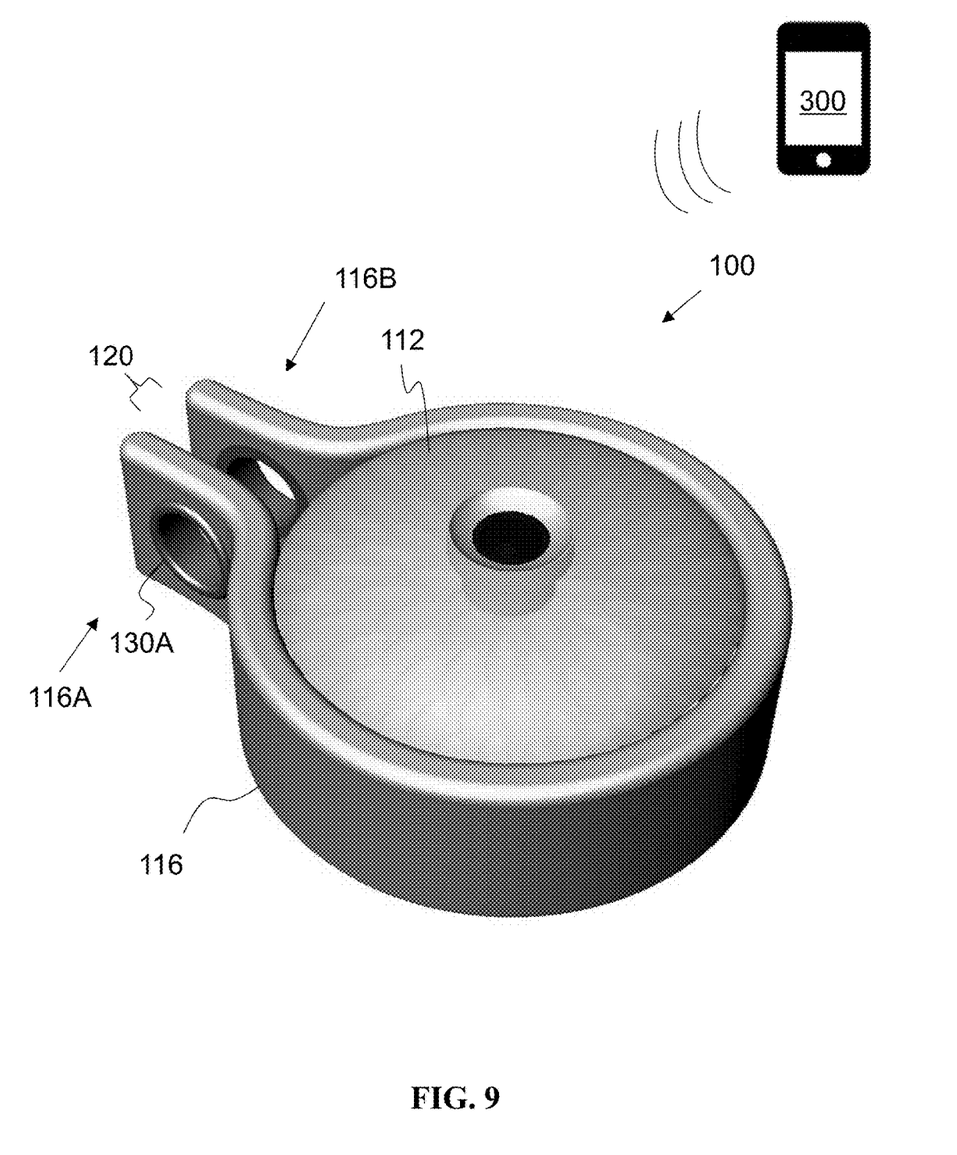
FIG. 9 is a perspective view showing another embodiment of the article of jewelry 100 with a nonconductive collar 130A.
Figure 10:
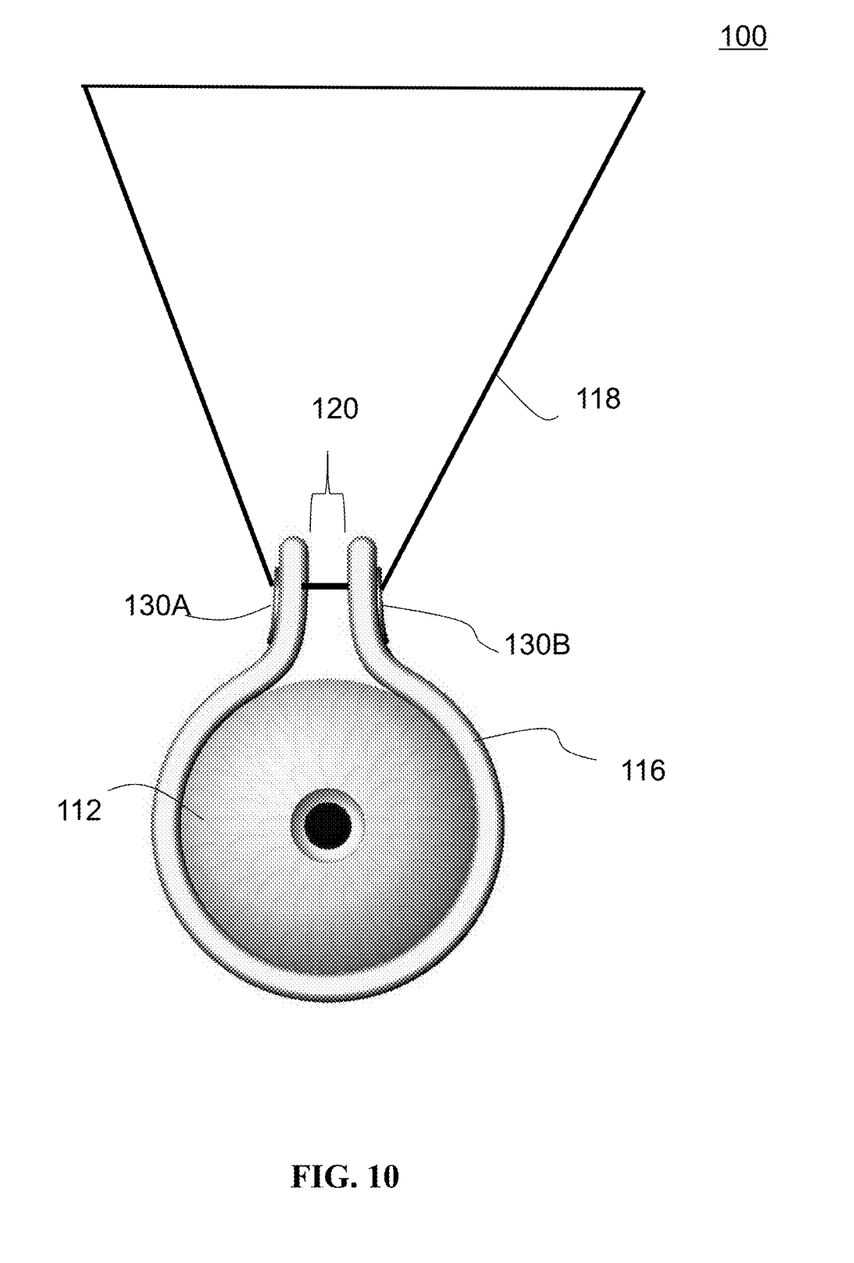
FIG. 10 depicts the article of jewelry shown in FIG. 9 embodied as a necklace in a locked configuration.

As with the embodiment shown in FIGS. 1-4, in the embodiment of FIGS. 9-10 the bezel 116 is formed from an electrically conductive material such as silver or gold and can be a noncontinuous ring having opposing ends separated by a gap 120; however, in the article of jewelry 100 shown in FIGS. 9-10 the opposing ends 116A, 116B are flanged outward, bored to provide throughbores, and fitted with insulating or nonconductive collars 130A, 130B. When fitted, the collars 130A, 130B prevent electrical connection between the bezel 116 and an electrically conductive substrate 118 (also referred to as a connector) threaded through the collars 130A, 130B as shown in FIG. 10. Thus, when fitted with the collars 130A, 130B, near field communication is permitted with the NFC chip 114, which defines an open configuration that is open to communication with an NFC enabled device 300. When the collars 130A, 130B are removed from the throughbore, such as slid out of a friction fitting with the throughbores, slid out of a tongue and groove fitting with the throughbores, or unscrewed from the throughbores, the electrically conductive substrate 118 is permitted to contact the opposing ends 116A, 116B of the bezel 116 to establish an electrically conductive loop, which interferes with near field communication with the NFC chip 114 thus establishing a closed configuration that protects data stored on the NFC chip 114.

Figure 11:
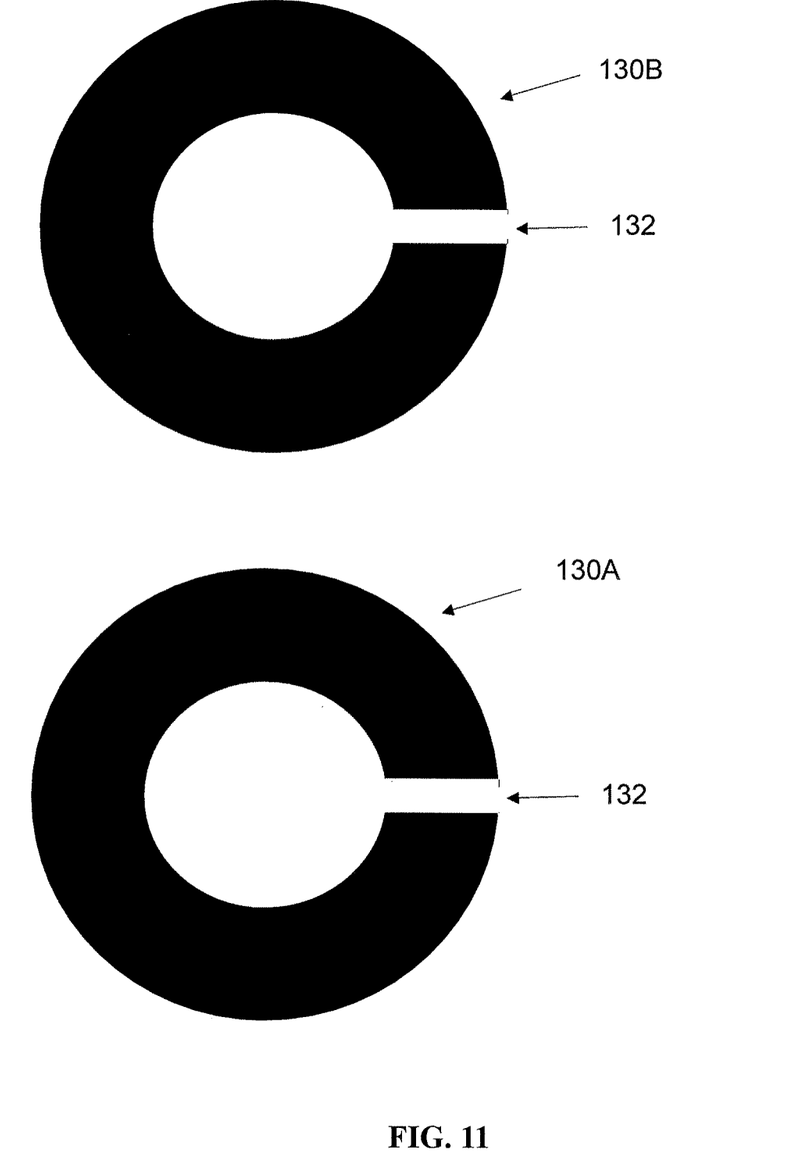
FIG. 11 depicts slotted 132 collars 130A, 130B.

In a related embodiment shown in FIG. 11, the collars 130A, 130B are rotatable within the throughbore and have a slot 132 that separates opposing ends of the collar 130A, 130B. By separating the ends of a rotatable collar 130A, 130B, rotation of the collar 130A, 130B permits the slot 132 to be aligned with the electrically conductive substrate 118, which permits electrical contact between the electrically conductive substrate 118 and the bezel 116 thereby defining a closed configuration that interferes with or prevents communication between the NFC chip 114 and an NFC enabled device 300. The collar 130 can then be further rotated to misalign the slot 132 with the electrically conductive substrate 118 to permit electrical contact between the electrically conductive substrate 118 and the bezel 130, thereby defining a closed configuration that allows communication between the NFC enabled device 300 and the NFC chip 114.

Figure 12:
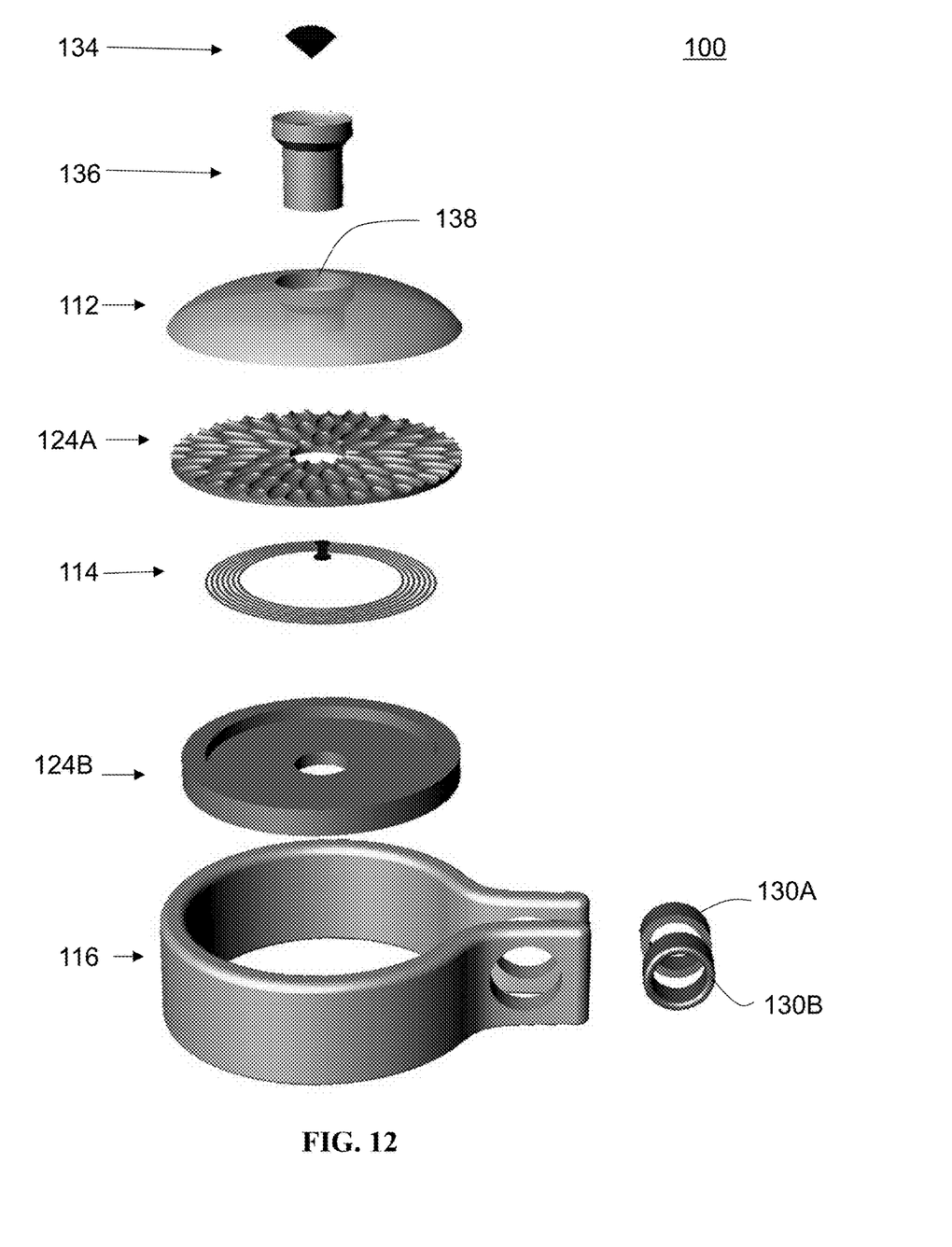
FIG. 12 is an exploded view of the article of jewelry 100 of FIG. 9.

Turning to FIG. 12, an exploded view of an exemplary article of jewelry 100 is provided, which shows how a NFC chip 114 can be securely housed and surrounded by a bezel 116. The NFC chip 114 can be layered between an upper substrate 124A (shown as mother of pearl) and a lower substrate 124B, each being nonconductive. In this case, a semi-transparent gem 112 (sufficiently transparent to permit viewing of the mother of pearl) can be layered over the upper substrate 124A. Also in this variation a secondary gem 134 is mounted to a mount 136 that is fitted into an aperture 138 of the gem 112.

With reference to FIGS. 9-12, the invention also provides a article of jewelry 100 for protecting data stored on a near field communication (NFC) chip 114; and a method for protecting data stored on a near field communication (NFC) chip 114 within an article of jewelry 100, the method including providing an article of jewelry 100 in a closed configuration, wherein the near field communication (NFC) chip 114 includes data. In some embodiments, the method includes an article of jewelry 100 with an electrically conductive substrate 118 threaded through collars 130A, 130B, wherein the collars 130A, 130B interfere with electrical connection between the bezel 116 and the substrate 118.

Similarly, the invention provides a method of protecting data, which includes providing an article of jewelry 100 in an open configuration, wherein the article of jewelry 100 includes a precious or semiprecious gem 112, a near field communication (NFC) chip 114 loaded with data, and a bezel 116, wherein the bezel 116 is formed of an electrically conductive material, further wherein the article of jewelry 100 is switchable between the open configuration that permits near field communication with the NFC chip 114, and a closed configuration that prevents near field communication with the NFC chip 114; providing an NFC enabled device 300; writing data to the NFC chip 114 with the NFC enabled device 300; and closing the article of jewelry 100 to the closed configuration.

As is evident in view of FIGS. 9-12, the article of jewelry 100 used for protecting data can include bezel 116 with opposing ends 116A, 116B separated by a gap 120, each opposing end 116A, 116B having a throughbore and a removable collar 130A, 130B configured to fit in the throughbore, wherein the collars 130A, 130B are formed from a nonconductive material, further wherein the closed configuration defined by collars 130A, 130B removed from the throughbores and an electrically conductive substrate electrically connecting the opposing ends 116A, 116B of the bezel 116 and the open configuration defined by the collars 130A, 130B fitted within the throughbores and interfering with electrical connection between the electrically conductive substrate 118 and the bezel 116.

The invention described herein may be embodied in other specific forms without departing from the spirit or essential characteristics thereof. The specific embodiments previously described are therefor to be considered as illustrative of, and not limiting, the scope of the invention.

What is claimed is:

1. An article of jewelry comprising a precious or semi-precious gem; a near field communication (NFC) chip; and a bezel, wherein the bezel comprises an electrically conductive material positioned along a same plane as the NFC chip, further wherein the bezel is switchable between a closed configuration defined by a continuous electrically conductive loop encircling the NFC chip and an open configuration defined by a gap preventing formation of an electrically conductive loop continuously encircling the NFC chip.

2. The article of jewelry according to claim 1, wherein the gem is a gemstone selected from the group consisting of an agate, an alexandrite, an amber, an ametrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, an iolite, a jadcite, a kupzite, a lapis lazuli, a moonstone, a malachite, a moamite, an onyx, an opal, a pearl, a peridot, a red corundum, a ruby, a sardonyx, a sapphire, a spessartine, a sphene, a spinel, a star ruby, a sapphire, a sunstone, a tanzanite, a tiger eye, a tourmaline, a topaz, a turquoise, a tsavorite, a moissanite, and a zircon.

3. The article of jewelry of claim 1, wherein the bezel is opened and closed by displacement of an electrically conductive connector across the gap.

4. The article of jewelry of claim 3, wherein the connector comprises two ends, wherein a first end is fixedly connected to the bezel and a second end is reversibly connectable to the bezel.

5. The article of jewelry of claim 4, wherein the first end of the connector is hinged to the bezel.

6. The article of jewelry according to claim 1, wherein the bezel is silver or gold.

7. A method of protecting data stored on a near field communication (NFC) chip within an article of jewelry, the method comprising providing the article of jewelry of claim 1 in a closed configuration, wherein the near field communication (NFC) chip comprises data.

8. An article of jewelry comprising a precious or semiprecious gem; a near field communication (NFC) chip; and a bezel substantially but not entirely surrounding the NFC chip, wherein the bezel comprises an electrically conductive material, further wherein the article of jewelry is switchable between a closed configuration defined by a continuous electrically conductive loop encircling the NFC chip and an open configuration defined an absence of the continuous electrically conductive loop.

9. The article of jewelry according to claim 8, wherein electrically conductive material is silver or gold.

10. The article of jewelry according to claim 8, wherein the bezel has opposing ends that are flanged outward.

11. The article of jewelry according to claim 10, wherein each opposing end comprises a throughbore and a removable collar configured to fit in the throughbore, wherein the collars are formed from a nonconductive material.

12. The article of jewelry according to claim 11, further comprising an electrically conductive substrate threaded through the collar, wherein the collars interfere with electrical connection between the bezel and the substrate.

13. A method of protecting data stored on a near field communication (NFC) chip within an article of jewelry, the method comprising providing the article of jewelry of claim 8 in a closed configuration, wherein the near field communication (NFC) chip comprises data.

14. A method of protecting data, comprising:
a) providing an article of jewelry in an open configuration, wherein the article of jewelry comprises a precious or semiprecious gem, a near field communication (NFC) chip comprising data, and a bezel, wherein the bezel comprises an electrically conductive material, further wherein the article of jewelry is switchable between the open configuration that permits near field communication with the NFC chip, and a closed configuration that prevents near field communication with the NFC chip;
b) providing an NFC enabled device;
c) writing data to the NFC chip with the NFC enabled device; and
d) closing the article of jewelry to the closed configuration.

15. The method according to claim 14, wherein the bezel comprises opposing ends separated by a gap, each opposing end comprising a throughbore and a removable collar configured to fit in the throughbore, wherein the collars are formed from a nonconductive material, further wherein the closed configuration defined by collars removed from the throughbores and an electrically conductive substrate electrically connecting the opposing ends of the bezel and the open configuration defined by the collars fitted within the throughbores and interfering with electrical connection between the electrically conductive substrate and the bezel.

* * * * *